Dec. 31, 1929.  L. F. MOODY  1,741,787
RUNNER FOR TURBINES
Filed April 15, 1922   2 Sheets-Sheet 2
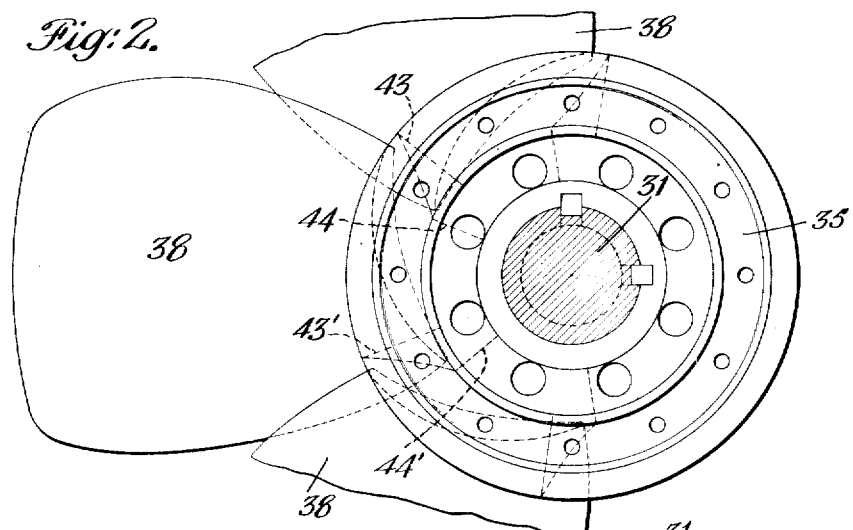
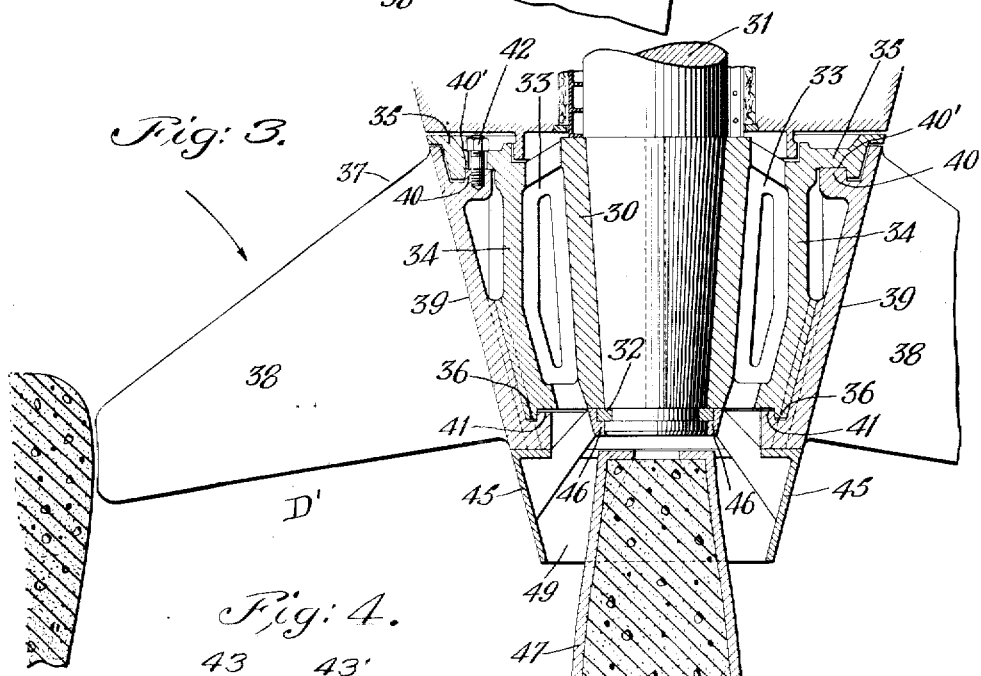
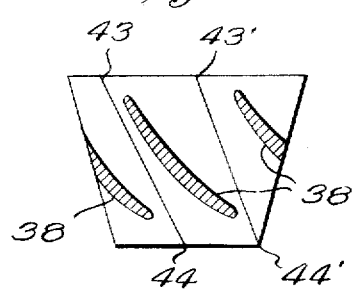
INVENTOR
Lewis F. Moody
BY
Edwards, Sager & Bauer
ATTORNEYS Patented Dec. 31, 1929

1,741,787

UNITED STATES PATENT OFFICE

LEWIS FERRY MOODY, OF PHILADELPHIA, PENNSYLVANIA

RUNNER FOR TURBINES

Application filed April 15, 1922. Serial No. 553,294.

This invention relates to hydraulic turbines and to the formation of the rotary element or runner of turbines or pumps and particularly to runners of the unshrouded blade type. In prior practice it has been usual to form the runners of turbines or pumps with the blades or vanes in one integral casting or inseparably connected to the hub so that it is necessary to provide for removal of the whole runner as a unit for repair or replacement. In many installations this greatly increases the cost of the turbine or pump, and it is highly desirable to be able to remove the runner vanes separately and then, if necessary, to remove the hub. If a vane is injured by striking an obstacle, if corrosion occurs, if the vane shape is to be changed by chipping to alter or correct the operating characteristics in any of these contingencies it is the vanes which require removal and not the whole runner.

One object of the present invention is to provide a turbine or pump structure in which the runner is formed in sections which are separable while the runner is in place so that a blade or blades may be detached for repair or replacement and the whole runner may be removed or replaced in separate sections. It is therefore unnecessary to provide for removal of the assembled runner as a unit and much smaller diameters of turbine pit, cover plates and the like can be adopted with great saving in cost of the unit and even of the station structure.

A further object of the invention is to provide a means for supporting the runner and shaft at times when the turbine is being dismantled or whenever the rotating parts are not being supported by the thrust bearing of the unit as is the case when the thrust bearing is being dismantled or adjusted.

In the accompanying drawings illustrating the invention,

Figs. 2 and 3 are plan and sectional views respectively of another runner illustrating a modification.

Fig. 4 is a view of a runner constructed according to this invention.

Figure 1:
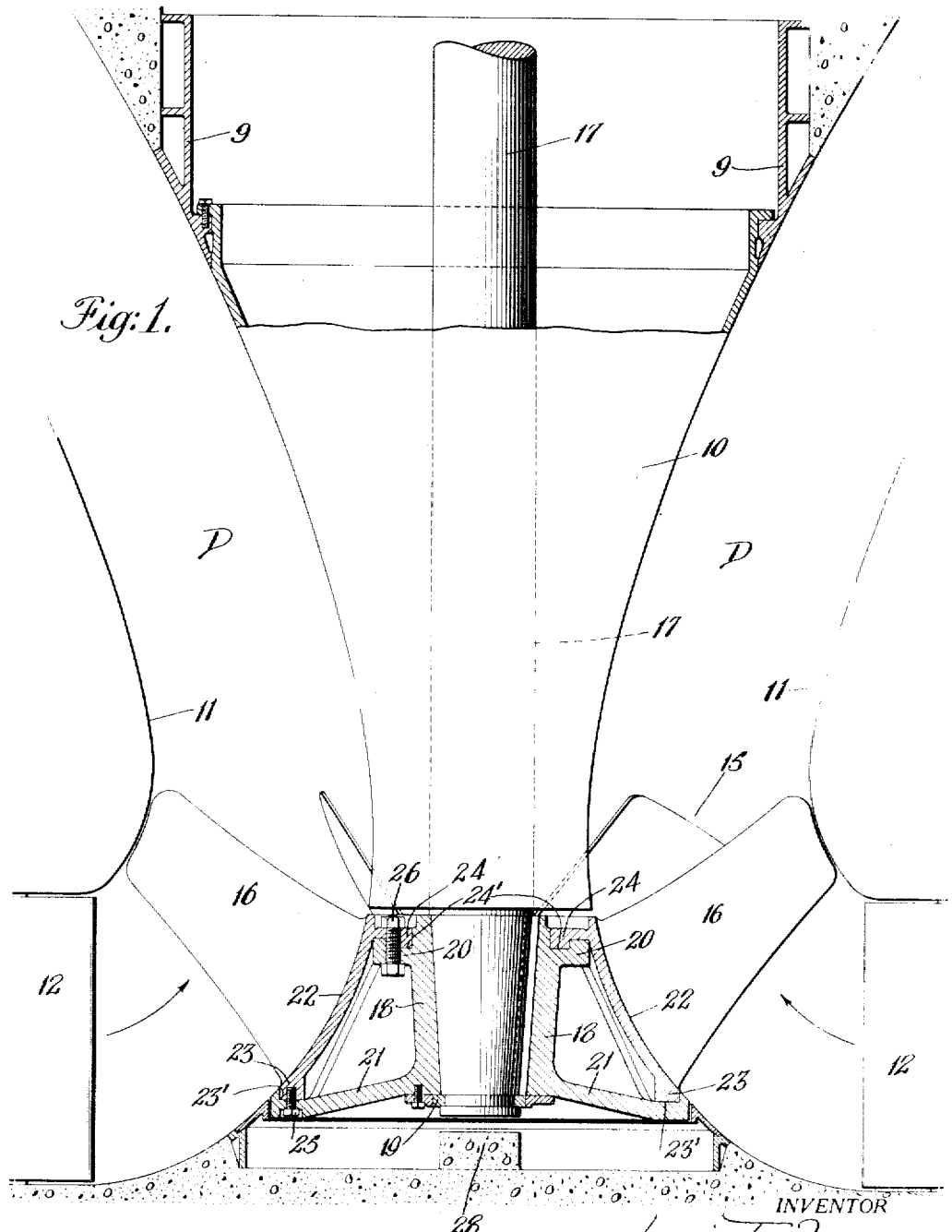
Fig. 1 is a vertical sectional view of a turbine structure showing a runner formed in accordance with this invention.

In the specific embodiment of the invention shown in Fig. 1 a turbine structure has adjustable inlet guide vanes 12 through which the flow passes to the runner 15 and outward and upward through the annular draft tube D between the outer wall 11 and the inner conical core member 10 suspended from the pit liner 9 above. The runner 15 is of the inverted diagonal type adapted for upward and inward flow in the direction of the arrows and with the blades or vanes 16 extending directly across the flow lines and having their outer ends unshrouded. The runner is supported by the vertical shaft 17 and comprises a central hub or spider structure 18 keyed to the end of the shaft and held thereon by the locking ring 19. The hub 18 has an upper flange ring 20 and a lower flange ring 21 and to these rings the runner sections carrying the blades 16 are attached. Each blade section comprises a body part 22 seating at its lower end 23 in the annular recess 23' formed in the outer edge of the flange ring 21 and having at its upper end an inner extension 24 fitting in the circular groove 24' in flange ring 20, bolts 25 and 26 being provided to hold these sections in place. The sections 22 fit together around the hub to form the outer hub surface in substantially the shape of a conical frustum slightly concaved inward. Preferably each section 22 will carry only one blade or vane 16 and each of these blade sections is separately removable for repair or replacement and when the whole runner is to be removed the blade sections are first taken off and then the hub section removed. This permits the minimum diameter of the walls 11 as well as the walls of the pit liner 9 to be made smaller than the diameter of the runner.

In order to support the runner and shaft during dismantling of portions of the unit or during repair or replacement of the thrust bearing for the shaft, the projection 28 is provided adjacent the lower end of the shaft 17 and when the shaft and runner are lowered slightly the end of the shaft will rest on this support 28.

In Figs. 2 and 3 the runner hub 30 is keyed to the shaft 31 and locked thereon by ring 32; by webs 33 it carries an outer portion 34 provided above with flange ring 35 and below with the circular lip 36 for attachment of the vane sections. Each vane section 37 comprises a vane 38 and a body 39 having an upper flange 40 engaging in groove 40' of the flange ring 35 and a lower flange 41 forming a recess receiving the lip 36. Bolts 42 connected to the flanged segments 40 and passing through flange ring 35 fasten the vane sections in place on the hub. The body portions 39 of the vane sections have their meeting ends extending in an inclined direction around the conical surface formed by the assembled sections so as to permit each section to carry a full vane 38 with the vanes overlapping. For instance in Fig. 2 the upper end of the body portion 39 corresponding to the vane 38 shown in full extending to the left, is contained between the lines 43 and 43', while the lower end of this body portion 39 is designated by the lines 44 and 44'. This general inclination of the vane sections may of course be varied according to the number and form of the vanes.

The vanes 38 are of the diagonal type extending directly across the diagonally inward and downward flow lines and having their shape conforming to substantially straight line directrices. A draft tube D' conducts flow from the runner. The lower smaller end of the conical hub is provided with a depending ring member 45 having its outer surface coinciding with the conical shape of the hub and carrying an inner ring 46 holding the locking ring 32 in place. Protruding upward and extending within the ring member 45 is a cap portion 47 of a core 48 of an annular draft tube. The top surface of this cap 47 is positioned closely adjacent to the lower surface of the shaft and ring 46 so that the shaft 31 and runner when lowered slightly will rest on this cap 47 and be supported thereby. A downwardly directed annular space 49 is left between the ring member 45 and cap 47 so as to provide a suction space for the discharge of leakage water.

With the sectional runner of this invention the pattern work and casting is simplified and cheapened. In order to take care of all ordinary runner repairs it is only necessary to have on hand a few extra runner sections. The diameter of flow passages and pit may be determined by the desired size and form of these parts and they do not have to be large enough to pass the full diameter of the runner. The runner itself may be as large as desired and still be capable of shipment when separated into its parts.

I claim:—

1. In a runner for a turbine or pump the combination with a central hub portion, of a plurality of separable vane sections mounted thereon and having vanes extending diagonally outward, said vane sections having meeting edges extending in an inclined direction around the hub surface to form the outer peripheral portion thereof.

2. In a runner for a turbine or pump the combination with a central hub portion, of a plurality of separable vane sections fastened in fixed position on said central portion and having vanes extending diagonally outward and unshrouded at their outer ends, each vane section rigidly carrying a single vane in the fixed relation to the runner axis and adapted to be radially removed from said hub portion while remaining in a radial plane intermediate the end of the hub.

3. In a runner for a turbine the combination with a central hub portion, of a plurality of separable vane sections having body portions with meeting edges extending in an inclined direction around the hub detachably fitted to said sub portion and forming the surface of said hub with continuous circular contour when assembled.

4. In a runner for a turbine the combination with a central hub portion having spaced annular surfaces, of a plurality of separable vane sections having segmental surfaces fitted to said annular surfaces and adapted for detachment therefrom while said annular surfaces remain in fixed relation to each other, said segmental surfaces forming the surface of said hub with continuous circular contour when assembled thereon.

5. In a runner for a turbine the combination with a central hub portion having spaced annular recesses, of a plurality of separable vane sections having segmental surfaces detachably fitted to said annular recesses and forming the surfaces of said tube when assembled thereon.

6. In a runner the combination with a central hub portion of a series of vane sections mounted thereon, an annular shoulder on said hub portions adapted to hold said sections radially and bolting means axially clamping said sections in place.

7. In a runner for a turbine or pump the combination with a central hub portion comprising a plurality of spaced coaxial flange rings, of a plurality of separable vane sections fitted to said flange rings and having vanes extending outwardly, said vane sections forming the outer peripheral portion of the runner hub.

8. In a runner for a turbine or pump the combination with a central hub portion comprising a plurality of spaced coaxial flange rings at least one of said rings having a cylindrical shoulder portion, of a plurality of separable vane sections mounted on said flange rings and fitted within said shoulder portion and having vanes extending outwardly, said vane sections forming the outer peripheral portion of the runner hub.

9. A runner for a turbine or pump comprising a central hub portion and a plurality of separable vane sections, means whereby said sections are normally fastened in fixed position on said central portions and are adapted to be laterally removed therefrom while remaining within the axial elements thereof, said vanes extending outwardly from the hub and being unshrouded at their outer ends, each vane section rigidly carrying a single vane, and said sections forming the surface of the runner hub.

10. In a hydraulic turbine a vertical shaft having a runner at its lower end, a draft tube below said runner, a central concrete core in said draft tube provided with a hollow metal cap at its upper end faced on its upper surface to support the runner when lowered below its normal running position.

11. In a hydraulic turbine a vertical shaft having a runner at its lower end, a draft tube below said runner, a central concrete core in said draft tube provided with a hollow metal cap at its upper end faced on its upper surface to engage the lower end of the shaft when lowered below its normal running position.

12. In a hydraulic turbine an unshrouded sectional runner having blades which when viewed in a plane normal to the axis, overlap each other in the portion of the runner near the hub, each blade being carried by a separable portion of the hub.

13. In a hydraulic turbine an unshrouded sectional runner having blades which when viewed in a plane normal to the axis, overlap each other in the portion of the runner near the hub, each blade being carried by a separable portion of the hub, and each section of the hub having meeting edges extending in an inclined direction around the hub surface.

14. In a hydraulic turbine an unshrouded sectional runner having blades in which the intersection of the entrance edge of one blade with the hub and the intersection of the discharge edge of the preceding blade with the hub are located approximately one above the other and relatively close to a common plane containing the axis of the hub, each blade being carried by a separable portion of the hub and each section of the hub having meeting edges extending in an inclined direction around the hub surface.

15. In combination with a hydraulic turbine having a hub member and a blade member extending therefrom and adapted to be moved with respect thereto, of means for supporting said blade by said hub, including a shaft rigidly secured to one of said members and having a recess formed therein, and means supported by the other of said members and extending within said recess to prevent relative axial displacement between said members.

16. The combination in a hydraulic turbine comprising a flow passage, a runner disposed therein and having a hub section carrying a removable blade section, and means adapted to hold said blade section against radial displacement with respect to the runner axis, and to allow removal of the blade section in a radial direction, said means including a circular groove in one of said sections and the other carrying a flange extending into said groove.

17. The combination in a hydraulic turbine comprising a flow passage, a runner disposed therein and having a hub section carrying a removable blade section, and means adapted to hold said blade section against radial displacement with respect to the runner axis, and to allow removal of the blade section in a radial direction, said sections having means providing cooperating surfaces overlapping in an axial direction, the surface associated with the hub section being disposed on the outside of the other surface to resist radial forces.

18. The combination in a hydraulic turbine comprising a flow passage, a runner disposed therein and having a hub section carrying a removable blade section, means adapted to hold said blade section against radial displacement with respect to the runner axis, and to allow removal of the blade section in a radial direction, said sections having means providing cooperating surfaces overlapping in an axial direction, the surface associated with the hub section being disposed on the outside of said other surface to resist radial forces, and means to prevent axial displacement of the blade section.

19. A turbine having a runner comprising in combination a central hub portion having spaced annular surfaces, and a plurality of separable vane sections having segmental surfaces detachably fitted to said annular surfaces, said vane sections being adapted to be detached by movement thereof in a radial direction while remaining in a radial plane disposed intermediate the ends of the hub.

20. A rotor for a hydraulic machine comprising a central hub portion having relatively axially and radially spaced supporting flanges, separable vane sections having surfaces for engagement with said flanges, and means for holding the same together.

21. A rotor for a hydraulic machine comprising a central hub portion having relatively axially and radially spaced supporting flanges, separable vane sections having surfaces for engagement with said flanges, and means for holding the same together, said engaging surfaces including plane surfaces for resisting axial displacement of the blades.

22. A rotor for a hydraulic machine comprising a hub having a plurality of circular flanges concentric to the hub axis, said flanges being axially spaced and one of the same having a greater diameter than the other, and vane sections having flanges cooperating with said hub flanges.

23. A rotor for a hydraulic machine comprising a hub having a plurality of circular flanges concentric to the hub axis, said flanges being axially spaced and one of the same having a greater diameter than the other, and vane sections having flanges cooperating with said hub flanges, said vane sections when in their assembled relation forming the outer contour of the hub.

24. A rotor for a hydraulic machine comprising a hub section having axially spaced relatively fixed flanges, removable vane sections having surfaces for engaging said flanges, and means forming a continuation of said hub and having means for holding the hub to its supporting shaft.

LEWIS FERRY MOODY.

CERTIFICATE OF CORRECTION.

Patent No. 1,741,787.　　　　　　　　　　Granted December 31, 1929, to

LEWIS FERRY MOODY.

It is hereby certified that error appears in the printed specification of the above numbered patent requiring correction as follows: Page 2, line 102, claim 5, for the words "surfaces of said tube" read "surface of said hub"; and that the said Letters Patent should be read with this correction therein that the same may conform to the record of the case in the Patent Office.

Signed and sealed this 24th day of June, A. D. 1930.

(Seal)

M. J. Moore,
Acting Commissioner of Patents.

flanges concentric to the hub axis, said flanges being axially spaced and one of the same having a greater diameter than the other, and vane sections having flanges cooperating with said hub flanges, said vane sections when in their assembled relation forming the outer contour of the hub.

24. A rotor for a hydraulic machine comprising a hub section having axially spaced relatively fixed flanges, removable vane sections having surfaces for engaging said flanges, and means forming a continuation of said hub and having means for holding the hub to its supporting shaft.

LEWIS FERRY MOODY.

CERTIFICATE OF CORRECTION.

Patent No. 1,741,787.   Granted December 31, 1929, to

LEWIS FERRY MOODY.

It is hereby certified that error appears in the printed specification of the above numbered patent requiring correction as follows: Page 2, line 102, claim 5, for the words "surfaces of said tube" read "surface of said hub"; and that the said Letters Patent should be read with this correction therein that the same may conform to the record of the case in the Patent Office.

Signed and sealed this 24th day of June, A. D. 1930.

(Seal)

M. J. Moore,
Acting Commissioner of Patents.